United States Patent [19]

Hillinger

[11] Patent Number: 4,749,601
[45] Date of Patent: Jun. 7, 1988

[54] COMPOSITE STRUCTURE

[76] Inventor: Brad O. Hillinger, 3504-½ Manhattan Ave., Manhattan Beach, Calif. 90266

[21] Appl. No.: 897,646

[22] Filed: Aug. 18, 1986

Related U.S. Application Data

[63] Continuation-in-part of Ser. No. 727,289, Apr. 25, 1985, Pat. No. 4,606,959.

[51] Int. Cl.⁴ .................................................. B32B 3/12
[52] U.S. Cl. .................................... 428/73; 52/806; 428/116; 428/118
[58] Field of Search ............... 52/806; 428/73, 116, 428/118

[56] References Cited

U.S. PATENT DOCUMENTS

| | | | |
|---|---|---|---|
| 2,797,447 | 7/1957 | Winer | 428/73 |
| 2,833,004 | 5/1958 | Johnson et al. | 428/73 X |
| 3,224,924 | 12/1965 | Von Ardenne et al. | 428/117 |
| 3,391,056 | 7/1968 | Robinson, Jr. | 428/116 X |
| 3,753,843 | 8/1973 | Hutchison | 428/116 |
| 3,789,094 | 1/1974 | Hutchison | 428/116 X |
| 4,083,159 | 4/1978 | Hatch et al. | 428/116 X |
| 4,084,366 | 4/1978 | Saylor et al. | 428/116 X |
| 4,194,313 | 3/1980 | Downing | 428/116 X |
| 4,353,947 | 10/1982 | Northcut | 428/116 |
| 4,382,106 | 5/1983 | Royster | 428/116 X |
| 4,461,796 | 7/1984 | Fukahori et al. | 428/116 |
| 4,465,725 | 8/1984 | Riel | 428/116 |
| 4,606,959 | 8/1986 | Hillinger | 428/116 |

FOREIGN PATENT DOCUMENTS

| | | | |
|---|---|---|---|
| 208946 | 11/1966 | Sweden | 428/192 |
| 893587 | 1/1982 | U.S.S.R. | 428/73 |

*Primary Examiner*—Henry F. Epstein
*Attorney, Agent, or Firm*—Oldham, Oldham & Weber Co.

[57] ABSTRACT

Rigid lightweight composite panel. The panel comprises a honeycomb core, and sheets of rigid lightweight polyvinyl chloride (PVC) having a foamed center and smooth matte surfaces, bonded directly to opposite sides of the core, preferably by thin layers of pressure sensitive adhesive material. The panels are useful as custom exhibits and for other purposes.

10 Claims, 2 Drawing Sheets

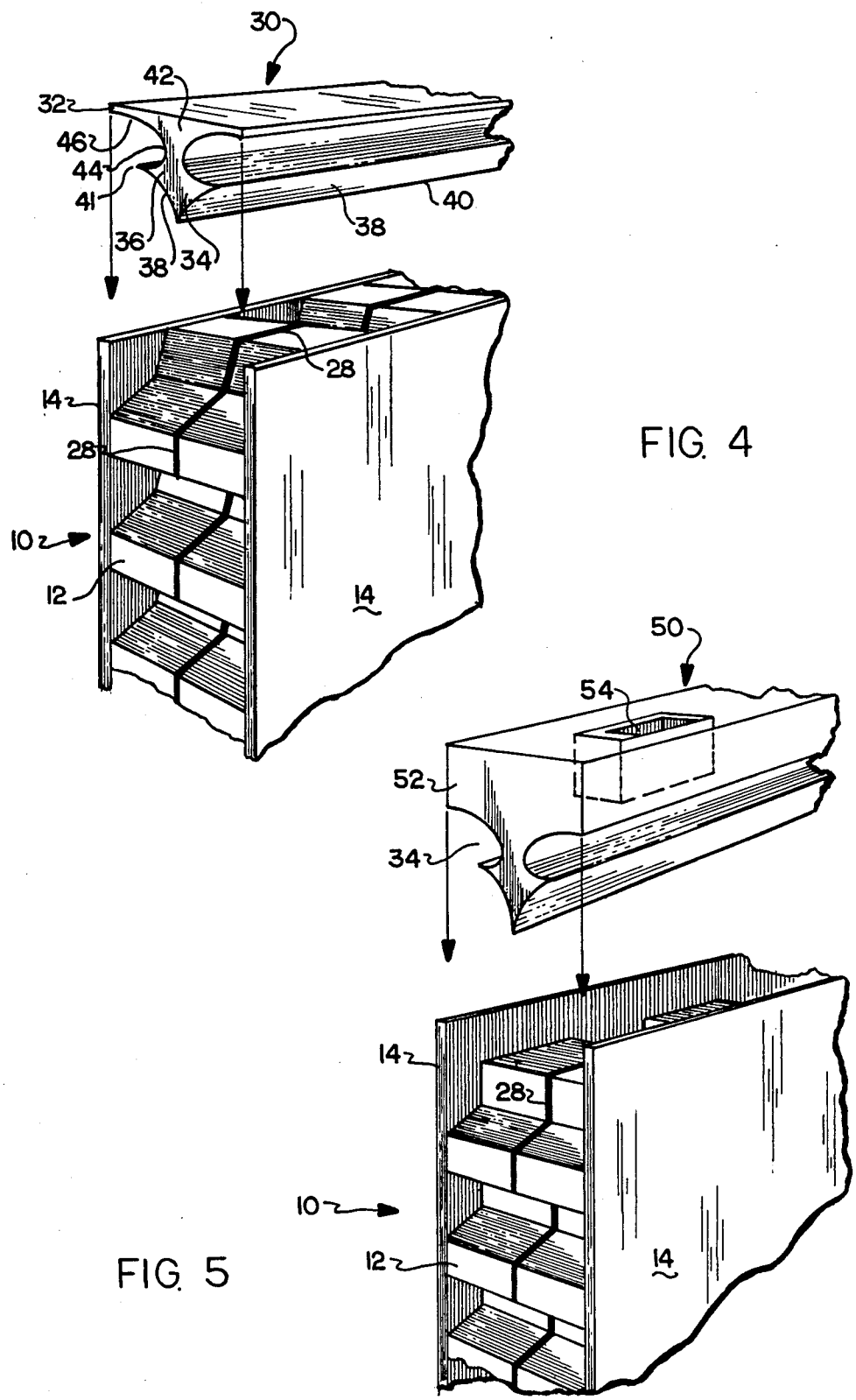

COMPOSITE STRUCTURE

CROSS REFERENCE TO EARLIER APPLICATION

This application is a continuation-in-part of applicant's copending application, Ser. No. 727,289, filed Apr. 25, 1985, now U.S. Pat. No. 4,606,959.

TECHNICAL FIELD

This invention relates to exhibits of the type used by exhibitors at trade shows, exhibitions and conventions to advertise and promote their goods or services. More particularly, this invention relates to custom exhibits.

BACKGROUND ART

There are two basic types of exhibits offered in the marketplace.

The first is a standard prefabricated portable component system. This type of system is normally used in small booth spaces. Portable systems are easily set up and dismantled and offer a wide variety of configurations and applications. They are also utilized in sales seminars, recruitment programs, and lobby displays. There are several manufacturers of protables in the marketplace. The first time exhibitor will normally use a portable or low-end system to accent his/her presentation at a trade show.

The second type of exhibit is referred to as a custom exhibit. The custom trade show exhibits can range from a simple 10 foot×10 foot booth space to a large two-story 100 foot×100 foot structure. The custom display will normally travel around the country, hence shipping becomes a factor in cost and design. A custom exhibit requires labor to set up and dismantle and it also requires storage arrangements. Custom exhibits are designed by either advertising departments within companies, ad agencies, exhibit design firms, or exhibit manufacturers.

Portable exhibits are light in weight and are easily moved from place to place. They will not support heavy loads, however. Panels having honeycomb cores have been used as portable exhibits. U.S. Pat. No. 4,194,313 to Downing illustrates an exhibit of this type.

Custom exhibits are much more sturdy and will support heavy loads. Such exhibits are used, for example, whenever heavy loads are to be mounted on vertical exhibit walls. Wood construction continues to dominate the custom exhibit field. Such construction typically includes wood framing, plywood sheeting and decorative materials which cover the framing and sheeting. Such exhibits are heavy and costly to build and to move from place to place.

The problems of existing exhibit panels have been overcome by the invention described and claimed in applicant's copending application Ser. No. 727,289 cited supra. Exhibits using the composite panels described and claimed therein combine the sturdiness of custom exhibits presently available with the light weight, portability and ease of assembly and disassembly which characterize standard or portable exhibits. Briefly, the composite panel of applicant's copending application comprises a multicellular (e.g. honeycomb) core, a pair of facing sheets, and a pair of rigid lightweight polyvinyl chloride sheets, each of which has a foamed center and a smooth thin skin on either side of the center, and each of which is bonded by a pressure sensitive adhesive to one of the facing sheets. Applicant has now found that one can achieve the same results without the facing sheets and with adhesives other than pressure sensitive adhesives.

DISCLOSURE OF THE INVENTION

It is an object of this invention to provide a composite structure which is light in weight and yet strong, and which is capable of being formed into free-standing shapes.

Another object of this invention is to provide a lightweight exhibit which is resistant to both fire and chemicals.

Another object of this invention is to provide a structure which can be readily formed into desired shapes without returning to its original shape.

Another object of this invention is to provide a composite structure which is particularly useful as an exhibit or display panel, for example for trade shows.

Another object of this invention is to provide a composite panel in which facing sheets are eliminated and lightweight rigid polyvinyl chloride sheets are bonded directly to a multicellular core.

These and other objects are realized according to this invention by a novel composite structure which comprises a multicellular core comprising a plurality of transversely extending open ended cells, and a pair of rigid light-weight polyvinyl chloride sheets each having a foamed center and a smooth thin skin on either side of the center, bonded to opposite sides of said core.

The composite structures of this invention are particularly useful as custom exhibits. They are preferably made in the form of wall sections or panels for this purpose. Composite structures of this invention which are intended for other purposes may also be made in the form of panels.

BRIEF DESCRIPTION OF DRAWINGS

In the drawings:

FIGS. 4 and 5 are exploded perspective fragmentary views of panels according to this invention showing useful edge closures therefor.

BEST MODE FOR CARRYING OUT THE INVENTION

This invention will be described with respect to a preferred embodiment thereof, as shown in the accompanying drawings.

Figure 1:
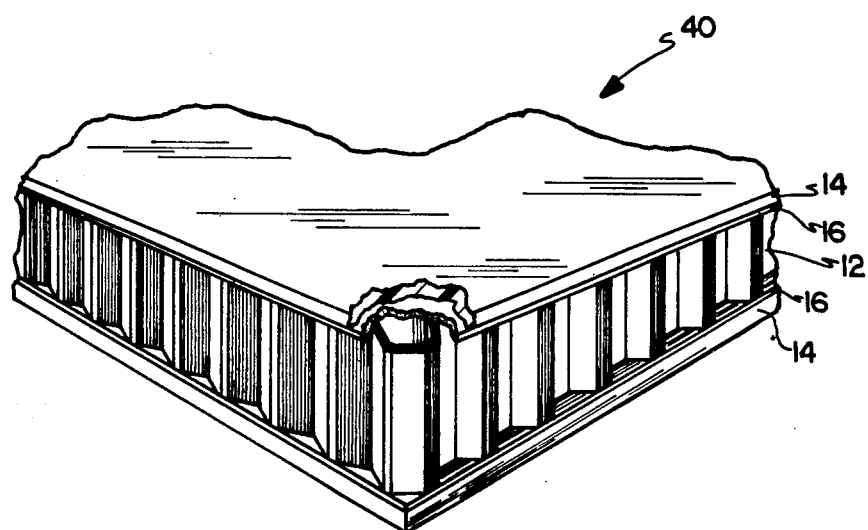
FIG. 1 is a perspective view of a panel according to a preferred embodiment of this invention, with parts cut away.
Figure 2:
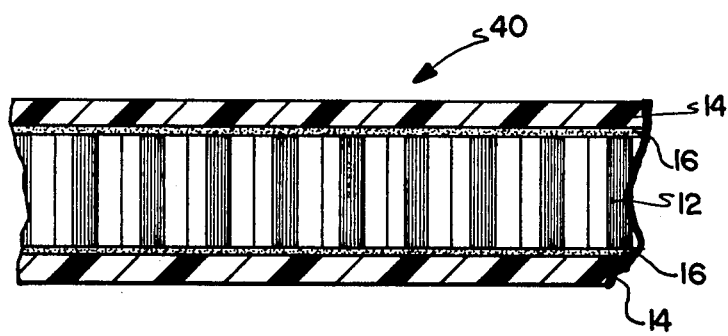
FIG. 2 is a cross-sectional view of a panel according to this first embodiment.

Referring now to FIGS. 1 and 2, 10 indicates generally a rigid light-weight honeycomb panel according to this invention. The panel 10 comprises a multicellular core such as a honeycomb core 12 having a multiplicity of transversely extended open-ended cells and layers 14 of a rigid light-weight plastic sheet material which are bonded directly to the open cells of core 12 on opposite sides of the core by thin layers 16 of adhesive material. In particular, the plastic sheet material is a smooth surface, light weight moderately expanded polyvinyl chloride (PVC) sheet material having a foamed center and a smooth thin skin on either side of the center, as will be hereinafter described more fully. The rigid light-weight plastic layers 16 form the outer layers of the panel for a variety of purposes. However, it is to be understood that additional layers can be laminated to these plastic layers by techniques to be described hereafter. Honeycomb core 12 and sheets 14 are typically rectangular in shape. Panels of this invention will also typically have edge closure strips, not shown in FIG. 1, to protect the honeycomb core 12; these have been omitted for the sake of clarity.

The preferred multicellular core 12 is a conventional honeycomb structure comprising a plurality of open-ended cells formed by cell walls which extend transversely, i.e. in the thickness direction of the composite structure. The cells are typically hexagonal in cross-sectional shape. The ends of these cells lie in parallel planes. The honeycomb core may be of any desired thickness, which will depend to some extent on the desired use for the finished structure. For custom exhibits the thickness of the honeycomb core 12 is typically from about 0.5 inch to about 4 inches. The standard thickness for this purpose is 1½ inches. The honeycomb core may be made of known materials, such as kraft paper which has been impregnated to improve its strength and fire retardancy.

A corrugated core having a plurality of open-ended transversely extending cells may replace the honeycomb core 12 if desired. Such corrugated cores may be made from conventional materials, such as corrugated paperboard or cardboard.

Foamed plastics have been tried as core materials and found unsatisfactory. Foamed plastics have "memory", that is, they will return to their original shape when bent. An important characteristic of the structure of this invention is that they can be formed into desired shapes and will retain these shapes. The core therefore must not have "memory". The aforedescribed honeycomb cores do not have "memory" and are well suited to the purposes of this invention.

The outer layer 14 is a rigid lightweight plastic material. By far the best material known to applicant is a rigid, moderately expanded polyvinyl chloride (PVC) sheet having a foamed center and a thin skin having a smooth matte outer surface on either side. Such a material is sold under the trademark SINTRA by Consolidated Aluminum, Inc. of St. Louis, Mo. This PVC sheet may be produced by continuous extrusion. Its density is about one-half that of "solid" PVC sheet produced by conventional methods. The material is resistant to fire and to most chemicals. The surface can be painted. In addition, the material has high impact strength. The material can be heat bent, which permits panels according to this invention to be bent into desired shapes. Sheets 14 may be comparatively thin. For example, a sheet about 2 to 3 millimeters (approximately 0.08 to 0.12 inch) thick in a composite structure of this invention having an overall thickness of about 1.5 to 2 inches is sufficient to give the overall required strength and rigidity to the composite structure. Sheet 14 may be thicker or thinner as required.

Other plastic sheet materials, e.g., acrylonitrile-butadiene-styrene (ABS) and acrylic sheet, have been tried without success.

It is very important to use a rigid lightweight plastic material as above described as the material for outer sheets 14. Use of this material with a honeycomb core 12 gives a structure having the structural strength of custom exhibits with the light weight, portability and ease of assembly associated only with standard or portable exhibits heretofore. This combination of properties is just simply not obtained if another material is used instead of moderately expanded rigid PVC as the outer layer 14, according to applicant's findings.

The adhesive layer 16 is a very thin layer of material capable of bonding to the sheets 14 of foamed plastic material (PVC) as well as to the cell ends in core 12. Many adhesives will not bond satisfactorily to PVC. Also, the adhesive must be capable of being applied at a temperature well below the softening point of PVC sheets 14, and preferably at normal ambient temperatures (i.e. about 20°–25° C. or 68°–77° F.). Once applied, the adhesive must be able to withstand temperatures which the composite structures of this invention may encounter in storage and use, i.e. up to about 140° F. (60° C.).

The preferred adhesive for use in the present invention is a free film pressure sensitive adhesive particularly an acrylic-vinyl acetate copolymer to which a small amount of a tackifying resin has been added to improve adhesion. The thickness of this film is typically about 0.0018 inch (0.05 mm) although it may be thicker or thinner. The thickness of this film has been greatly exaggerated in the drawing for the sake of clarity. The acrylic monomer component of the copolymer is typically butyl acrylate, 2-ethylhexyl acrylate, or a mixture of the two. Suitable adhesive materials and their preparation are known in the art and will therefore not be described in detail. Suitable adhesive products having a free film pressure sensitive adhesive as above described are commercially available; they are sold, for example, under the name PERMAPRINT IP-2000 by MACtac, Stow, Ohio. Alternatively, an adhesive construction comprising a thin non-adhesive plastic film which is coated on both sides with pressure sensitive adhesive material can be used if desired.

Figure 3:
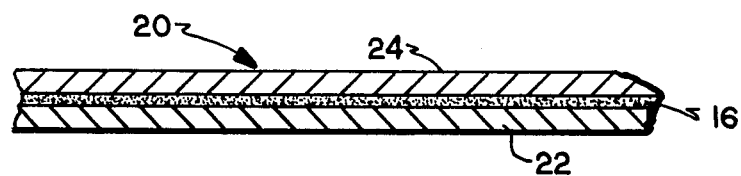
FIG. 3 is a cross-sectional view of a pressure sensitive laminate which is useful in making the panels of this invention.

A free film pressure sensitive adhesive 16 is generally used in the form of an adhesive laminate as shown in FIG. 3. Referring now to FIG. 3, a typical pressure sensitive adhesive product or laminate 20 comprises a free film 16 of pressure sensitive adhesive material which is adhesive on both sides, a first release liner 22, and a second release liner 24. The inner surfaces of both release liners (i.e. the surfaces in contact with the free film adhesive 16) are coated with very thin release coatings (not shown), which are typically silicones. Different silicones are typically used so that first release liner 22 will release before the second release liner 24. The two release liners may be made of the same or different materials; in a preferred adhesive product, the first release liner 22 is made of paper and the second release liner 24 is a thin film of polyethylene. The preferred free film adhesive material 16 is a thin film of acrylic-vinyl acetate copolymer as explained previously. The laminate 20 is ordinarily supplied in roll form. A preferred adhesive product of this type, as explained previously, is PERMAPRINT IP-2000, which is made and sold by MACtac, Stow, Ohio.

A flowable liquid or paste adhesive may be used instead of a pressure sensitive adhesive if desired. These flowable adhesives are generally sold in bulk in water or solvent base and may therefore be termed "bulk adhesives". They may be either water or solvent based. For example, white glue, which is water based, or contact cements, which may be either water based or solvent based, may be used. In general, any adhesive which is known to bond polyvinyl chloride to other materials may be used. A broader range of adhesive materials can be used in the practice of the present invention than in the practice of the invention described in applicant's earlier copending application, Ser. No. 727,289, because the open ended honeycomb cells herein impose fewer limitations on the choice of adhesive than do the kraft paper facing sheets in the earlier application. Adhesives which do not form strong adherent bonds between PVC and other materials are also unsuitable.

The composite structures of this invention are preferably made in the form of wall sections or panels. A convenient wall section size for custom exhibits is 4 feet×8 feet×1½ inches. These dimensions can be varied, for example, the thickness may be greater or less, e.g., from about 0.5 inch to about 4 inches. Panels for different purposes may have different dimensions as required for the intended use.

To form a panel according to this invention, it is preferred to apply the adhesive to one surface of each of the polyvinyl chloride sheets 14, then adhere the adhesive-coated surfaces of the PVC sheets to opposite sides of honeycomb core 12. The adhesives may be applied by means known in the art. For example, when the free film pressure sensitive adhesive laminate shown in FIG. 3 is used, the first release liner 22 is peeled off leaving one surface of the pressure sensitive adhesive film 16 exposed. This exposed surface is then placed on one surface of a PVC sheet 14 and pressure is applied. Pressure sensitive adhesive may be applied to PVC sheets 14 either one at a time or simultaneously. Next, a second release liner 24 is peeled off and the adhesive coated surface of PVC sheet 14 is applied to the open ends of the honeycomb cells of core 12. This also can be done using methods and machinery known in the art. The two sheets 14 can be applied either one at a time or simultaneously.

The order of assembly can be changed if desired, thus, one may apply the adhesive layer 16 to the open ends of the honeycomb cells of core 12 first, then apply the PVC sheets 14 to core 12.

It is necessary, or at least highly desirable for most purposes, to provide edge closures in order to protect the honeycomb core 12. Provision of these edge closures will now be described with reference to FIGS. 4 and 5.

Referring to FIG. 4, honeycomb core 12 has shallow slits 28 which extend inwardly from each of the four edges of the honeycomb core. Slits 28 lie in a common plane which is parallel to and preferably midway between the planes defined by the ends of the cells of honeycomb core 12. These slits may be formed by suitable means, such as a slitting machine or a razor blade.

Edge closure members are secured to honeycomb core 12 along each of the four edges thereof. One such edge closure member 30 is shown in FIG. 4. This edge closure has a thin strip 32, in the shape of a thin rectangular solid, and a core-engaging projection 34 extending forwardly from the inside of strip 32. Strip 32 and projection 34 are integrally joined together. Projection 34 may have any shape which will permit it to be inserted into slit 28 and to lockingly engage core 12 so that projection 34 and the attached strip 32 cannot be easily removed. A projection of preferred shape is shown in FIG. 4. This projection 34 extends the entire length of edge closure member 30, and appears to be generally arrow-shaped when viewed on end. Projection 34 is symmetrical about a plane which is perpendicular to the outside surface of the edge closure member 30. Projection 34 includes a forward portion 36, which is formed by two converging surfaces 38 (either planar or curved) that intersect along forward edge 40. Each of the converging surfaces 38 also has a trailing edge 41. Projection 34 also includes an aft portion 42, which includes a neck 44 and which is formed by two sweeping curved surfaces 46. These curved surfaces 46 extend from opposite sides of closure member 30, where projection 34 joins strip 32, to trailing edges 41, which are the lines of intersection with converging surfaces 38. Projection 34 is narrower at neck 44 than it is on either side thereof. Trailing edges 41 and neck 44 coact to provide locking engagement between projection 34 and honeycomb core 12. The function of trailing edges 41 is similar to that of a barb on a fishhook n this respect.

Another edge closure member 50 is shown in FIG. 5. Edge closure member 50 has a base portion 52, rectangular in shape and substantially thicker than strip 32 of edge closure member 30 of FIG. 4. Base portion 52 may have a hole 54 for a locking member (not shown) which permits coupling of one panel to another. Extending forwardly from the inside surface of base portion 52 is a core-engaging projection 34, which may be identical to its counterpart in FIG. 4.

The preferred end closure members 30 and 50 illustrated herein are preferably made of polyvinyl chloride (PVC). The base portion 32 of closure member 30 may be made of moderately expanded PVC. Alternatively, other materials, such as those disclosed in application Ser. No. 727,289, can be used.

Other forms of end closure members, such as those shown in FIGS. 4 and 5 of applicant's copending application Ser. No. 727,289 or as known in the art, may be used instead of the edge closure members shown herein. Slits 28 are not necessary when edge closure members as shown in applicant's copending application Ser. No. 727,289 are used.

Honeycomb panels 10 as described herein may be assembled as follows: First, slits 28 are formed in each of the four edges of honeycomb core 12, preferably by means described above. Next an edge closure member 30 or 50 is secured to each of the edges of honeycomb core 12 by inserting projection 34 of the edge closure member into slit 28. Once the projection 34 has been inserted, edge closure member 30 or 50 cannot be easily removed. Then sheets 14 are affixed to honeycomb core 12 as has been described above. Finally, edge closure members 30 or 50 are sealed to each other and to sheets 14 along adjacent edges thereof in order to form fluid tight closures. This may be done by conventional PVC welding techniques, e.g. by using a PVC welding rod in a known way.

It will be noted that the edge closure strips 30 or 50 are applied before sheets 14 in the preferred method.

According to an alternative method of assembly, the entire structure as shown in FIGS. 1 and 2, including the outer sheets 14, is formed first, then the edge strips are inserted in place so that the outside surfaces of the edge strips are flush with the edges of sheets 14 as shown in FIGS. 4 and 5. Finally, the adjacent portions of sheets 14 and strips 30 or 32 are welded together; this may be done by known PVC pipe welding techniques.

The methods of assembly disclosed herein can be used without modification when the edge closure members 30 or 50 are made of PVC. These methods may be used when the edge closure member 30 or 50 are made of other materials, but some means other than the use of conventional PVC welding techniques will be required for sealing the edge closure members 30 or 50 and sheets 14 together, Such other means, appropriate to the edge closure materials selected, will be apparent to those skilled in the art.

Composite structures having more layers than those shown in FIGS. 1 and 2 may be formed. For example, thin vinyl sheets may be placed on the outer surface of PVC sheets 14. A pressure sensitive adhesive layer similar to those previously described is applied to the outer surface of each of the two sheets 14, then the desired outer surface layer is applied to the pressure sensitive adhesive.

Lamination techniques for making panels of this invention may be similar to those used for mounting photoprints on substrates. Suitable techniques and apparatus for making these panels are known in the art.

Whether the PVC sheets 14 are bonded directly to the multicellular core 12 as in the present invention, or to facing sheets as in the invention described in copending application Ser. No. 727,289, the properties of the resulting composite structures are the same. The panels 10 in each case are both strong, yet light in weight. Honeycomb panels according to this invention are useful for a variety of purposes, including custom exhibits, graphic panels (e.g. for photo mounting), office partitions, room partitions, shelving, desks, chairs and three-dimensional outdoor lettering, for example. The combination of high strength and light weight is valuable in all of these applications. The present invention offers processing advantages over the invention described in co-pending application Ser. No. 727,289, because the facing sheets can be dispensed with and a wider range of adhesive materials used in the present invention.

Panels of this invention are especially useful as exhibits, particularly of the type used in trade shows. Panels of this invention are free standing. They can be used over and over again, and have a far longer life than panels now in use. Panels of this invention can be assembled and disassembled much more rapidly than presently known panels. They have high impact strength, and are not easily destroyed or damaged except by intentional hammer blows. These panels can be bent to desired shape and will retain the shape to which they are bent. The surfaces are easily painted. Finally, they are light in weight, so that they can be moved about easily from place to place.

While in accordance with the patent statutes, a preferred embodiment and best most has been presented, the scope of the invention is not limited thereto, but rather is measured by the scope of the attached claims.

What is claimed is:

1. A rigid lightweight composite structure comprising
   a multicellular core having a plurality of transversely extending open-ended cells; and
   a pair of rigid lightweight polyvinyl chloride sheets, each having a foamed center and a smooth thin skin on either side of said center, bonded to opposite sides of said core.

2. A structure according to claim 1 in which the core is a honeycomb core.

3. A structure according to claim 2 in which said honeycomb core is made of kraft paper.

4. A structure according to claim 1 in which said polyvinyl chloride sheets are applied directly to said multicellular core.

5. A structure according to claim 4 in which said polyvinyl chloride sheets are applied to said core by means of an adhesive.

6. A structure according to claim 5 in which said adhesive is a pressure sensitive adhesive.

7. A structure according to claim 5 in which said adhesive is a flowable liquid at its temperature of application.

8. A structure according to claim 1, said structure being in the form of a panel.

9. A structure according to claim 1, further including a plurality of edge closure members.

10. A structure according to claim 9 in which the ends of the cells lie in parallel planes, the core has a plurality of slits extending inwardly from the edges of the core and laying in a common plane parallel to the aforesaid planes, and said edge closure members have core-engaging projections adapted to be inserted into said slits.

* * * * *